US005684790A

United States Patent [19]
Hirasawa

[11] Patent Number: 5,684,790
[45] Date of Patent: Nov. 4, 1997

[54] MOBILE COMMUNICATION SYSTEM

[75] Inventor: Kazuhiro Hirasawa, Amagasaki, Japan

[73] Assignee: Mitsubishi Denki Kabushiki Kaisha, Japan

[21] Appl. No.: 501,158

[22] Filed: Jul. 11, 1995

[30] Foreign Application Priority Data

Jul. 22, 1994 [JP] Japan .................................. 6-171019

[51] Int. Cl.$^6$ ................................................ H04B 17/00
[52] U.S. Cl. ...................... 370/252; 370/332; 455/67.7; 340/539
[58] Field of Search ............................... 370/13, 17, 95.1, 370/95.3, 252, 331, 332, 333, 336, 337, 347; 455/38.1, 38.2, 38.3, 68, 69, 70, 67.1, 67.7; 340/539, 571, 506

[56] References Cited

U.S. PATENT DOCUMENTS

| | | | |
|---|---|---|---|
| 4,593,273 | 6/1986 | Narcisse | 455/69 |
| 4,777,653 | 10/1988 | Bonnerot et al. | 455/69 |
| 5,086,290 | 2/1992 | Murray et al. | 455/67.7 |
| 5,134,708 | 7/1992 | Marui et al. | 455/67.7 |
| 5,193,216 | 3/1993 | Davis | 455/67.7 |
| 5,199,031 | 3/1993 | Dahlin | 370/110.1 |
| 5,450,613 | 9/1995 | Takahara et al. | 455/38.2 |

OTHER PUBLICATIONS

*Draft Addemdum to NMT Document 900-4 (450)*, dated May 9, 1990, informally numbered pp. 20-27 (English language).

*Primary Examiner*—Douglas W. Olms
*Assistant Examiner*—Chau T. Nguyen
*Attorney, Agent, or Firm*—Rothwell, Figg, Ernst & Kurz, P.C.

[57] ABSTRACT

A mobile communication system that can preliminarily inform a user of the possibility of an occurrence of interruption of a call, which is peculiar to the system of the TDMA type. In this mobile communication system, a CPU measures a received level of speech quality by detecting data representing speech quality in an SACCH frame on the basis of a result of analysis of a received frame by means of a receiving portion. In the case where the received level is less than a predetermined value, a counting portion is caused to start counting. If the received level is low in the case of the next SACCH frame, the count is incremented. When the count reaches a predetermined value, a speaker serving as alarming means is operated so as to produce a warning tone. Thereby, a warning is given to a person who is currently using the system.

3 Claims, 6 Drawing Sheets

$S_1 > S_2 > S_3 > S_4 =$ SIGNAL LEVEL
$N_1 < N_2 < N_3 < N_4 =$ NOISE LEVEL

MOBILE COMMUNICATION SYSTEM

BACKGROUND OF THE INVENTION

1. Field of the Invention

This invention relates to a mobile communication system of the time division multiple access (TDMA) type that transmits and receives data according to a TDMA method by which a multiplexing is performed on a plurality of communication channels in the time domain. Further, this invention is applied to the detection of the speech quality of such a mobile communication system.

2. Description of the Related Art

FIGS. 8, 9A and 9B are diagrams for illustrating how an occurrence of an interruption of a call can be recognized or predicted by hearing noises gradually radiated from a speaker of the mobile station in the case where the speech or voice quality of the conventional analog mobile communication system is degraded. Further, each of FIGS. 9A and 9B are diagrams for showing the exterior of a mobile station of a conventional analog mobile communication system using an analog communication method.

In FIG. 8, reference numeral 1 designates a base station; 2 a mobile station which communicates with the base station by using an analog communication method; 3 a mobile station which is more distant from the base station 1 than the mobile station 2; and 4 electric field strength or intensity.

Further, in FIGS. 9A and 9B, reference numeral 5 denotes a speaker of the mobile station.

Next, an operation of the conventional mobile communication system will be described hereinbelow.

As shown in FIG. 8, in the case where the mobile station 2 goes further away from the base station 1 and moves to the position of the mobile station 3 during a call between the base station 1 and the mobile station 2, or in the case where there is generated an obstacle to radio communications between the base station 1 and the mobile station 2, the signal level drops, while the noise level rises. Thus the signal-to-noise ratio S/N corresponding to the used radio frequency is lowered. This results in that although the tone quality of the speaker 5 of the mobile station 2 is good as illustrated in FIG. 9A, that of the speaker 5 of the mobile station 3 is degraded as illustrated in FIG. 9B. Consequently, noises are caused by the speaker 5 of the mobile station 3. Thereby, a user of this mobile station can predict that the current call may be interrupted, and he can notify his party of this prediction to take a countermeasure.

Thus, in the case of the conventional analog mobile communication system, users can be conscious of a raise in the noise level and make provision for the interruption of a call. Moreover, in order to prevent an occurrence of the interruption of a call, the received electric field is measured at the base station 1 and another radio frequency is assigned to the call before the call is interrupted. However, such a processing may be too late to prevent an occurrence of interruption of a call and thus the call may be interrupted in the case where the volume of traffic transmitted or received over a radio channel is large.

Further, in the case of the conventional analog mobile communication system, when the speech quality is deteriorated, a user can recognize or predict by hearing noises gradually radiated from the speaker of a mobile station. However, in the case of a conventional mobile communication system of the TDMA type, even when numerous errors occur in received data, consistent speech quality can be maintained by performing an error-correcting operation in accordance with the specifications of the TDMA system. Thus a user can hear sounds radiated from the speaker as having substantially the same tone quality as a normal sound-quality level. Therefore, it is difficult for a user to know the degradation in speech quality of a speech signal actually transmitted or received over a radio channel. Consequently, the conventional mobile communication system of the TDMA type has encountered a problem in that a call may be suddenly interrupted in the case where the speech quality is degraded, for example, when the volume of traffic is large.

This invention is accomplished to resolve the aforementioned problem of the conventional system.

SUMMARY OF THE INVENTION

Accordingly, an object of the present invention is to provide a mobile communication system which can preliminarily inform a user of the possibility of an occurrence of interruption of a call, which is peculiar to the system of the TDMA type.

To achieve the foregoing object, in accordance with the present invention, there is provided a mobile communication system for transmitting and receiving data by performing a time division multiple-accessing, comprising at least one base station and at least one mobile station, which includes a control means for outputting an alarm control signal to a mobile station according to a comparison between a received level, which is obtained on the basis of a result of a detection of speech quality of an arbitrary frame within received frames, and a preset or predetermined level, and an alarming means for alarming according to the alarm control signal.

Thus, this mobile communication system has an advantage in that if the received level is judged as being close to a call interruption level, namely, a level at which a call is interrupted, the system can inform a user of the possibility of an occurrence of interruption of a call by operating and causing the alarming means to issue an alarm.

Further, in the case of an embodiment of this mobile communication system, the mobile station is further provided with a counter portion for counting the number of times, at which the received level is less than the predetermined level, according to results of the comparison between the received level and the predetermined level, which is made by the control means. Moreover, the control means is adapted to measure a received level by, each time when a frame is received, detecting data representing speech quality within the frame, and to further output an alarm control signal when it is known from data representing the number of times counted by the counter portion that received levels, which are successively obtained a predetermined number of times, are less than the predetermined level.

Thus, if a received level has been continuously maintained since the received level is judged as being close to the call interruption level, the counter portion is caused to start counting. Thereafter, when the count reaches the predetermined count value (or level), the alarming means is operated so as to issue an alarm. Thereby, this embodiment of the mobile communication system has an advantage in that a user can be preliminarily informed of the possibility of an occurrence of interruption of a call.

Alternatively, in the case of another embodiment of the mobile communication system of the present invention, the mobile station is further provided with a timer portion for measuring a time, during which the received level is less than the predetermined level, according to results of the comparison between the received level and the predetermined level, which is made by the control means. Moreover, the control means is adapted to measure a received level by, each time when a frame is received, detecting data representing speech quality within the frame, and to further output an alarm control signal when it is known from data representing the time measured by the timer portion that received levels, which are successively obtained during a predetermined time, are less than the predetermined level.

Thus, if a received level has been continuously maintained since the received level is judged as being close to the call interruption level, the timer portion is operated. Thereafter, when a predetermined time has passed, the alarming means is operated so as to issue an alarm. Thereby, this embodiment of the mobile communication system has an advantage in that the system can preliminarily notify a user of the possibility of an occurrence of interruption of a call.

In the cases of these embodiments of the mobile communication system of the present invention, the control means is adapted to detect data representing speech quality in a slow associated channel (SACCH) frame every time a SACCH frame is received.

Thus, the mobile communication system of the present invention has an advantage in that if the received level is judged on the basis of the reception of an SACCH frame as being close to a call interruption level, the system can inform a user of the possibility of an occurrence of interruption of a call by operating and causing the alarming means to issue an alarm.

Alternatively, in the cases of these embodiments of the mobile communication system of the present invention, the control means is adapted to detect data representing speech quality in a traffic channel (TCH) frame every time a TCH frame is received.

Thus, the mobile communication system of the present invention has an advantage in that if the received level is judged on the basis of the reception of a TCH frame as being close to a call interruption level, the system can notify a user of the possibility of an occurrence of interruption of a call by operating and causing the alarming means to issue an alarm.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Embodiment 1

Figure 7:
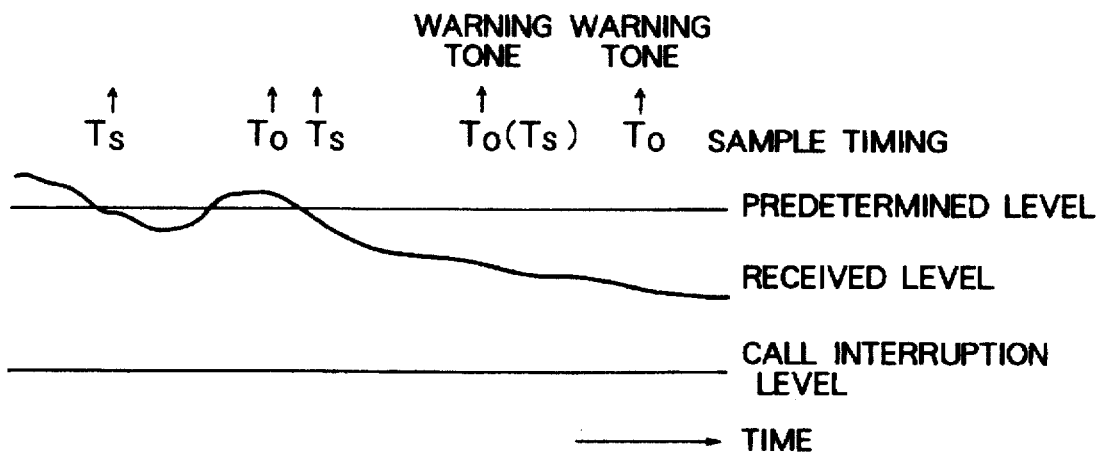
FIG. 7 is a timing chart for illustrating an operation of a CPU of FIG. 5 in order to describe the mobile communication system, namely, Embodiment 4 of the present invention.
Figure 8:
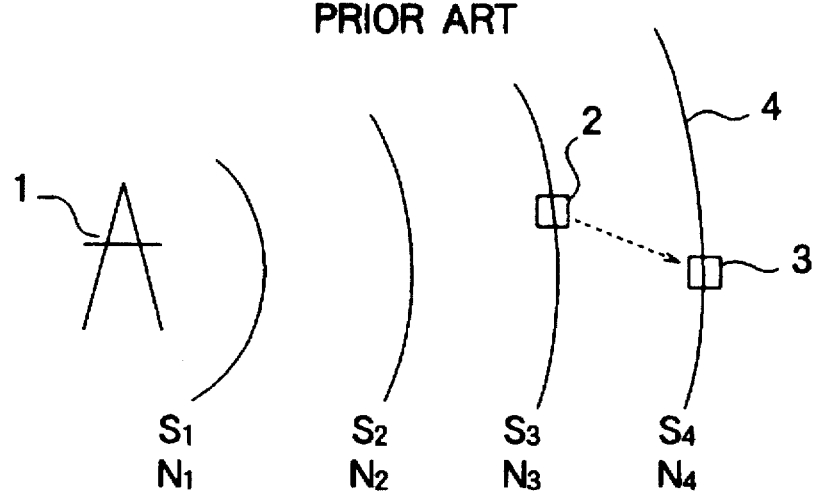
FIG. 8 is a diagram for illustrating how a call is interrupted in the conventional analog mobile communication system in the case where speech quality is degraded.
Figure 9A:
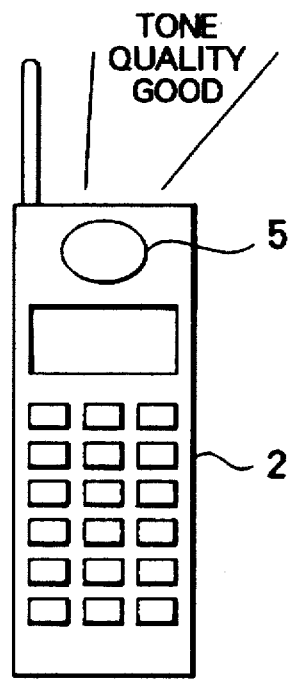
FIG. 9A is a diagram for illustrating the exterior of a mobile station of the conventional analog mobile communication system in the case where speech quality is good.
Figure 9B:
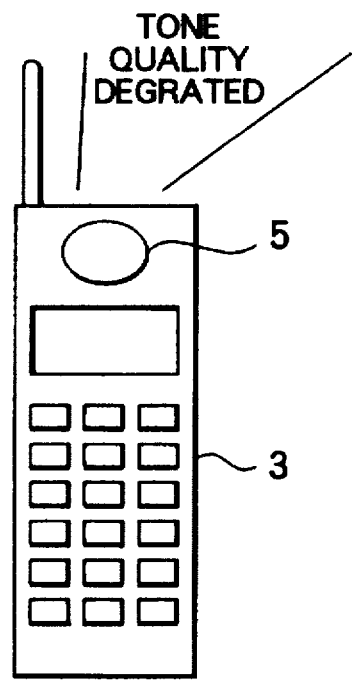
FIG. 9B is a diagram for illustrating the exterior of a mobile station of the conventional analog mobile communication system in the case of hearing noises gradually radiated from a speaker of the mobile station when speech quality is degraded.

FIG. 7 is a block diagram for illustrating a mobile communication system embodying the present invention (namely, Embodiment 1 of the present invention), which shows the configuration of a mobile station.

In this figure, reference numeral 10 designates an antenna; 11 a receiving portion for performing an analog-to-digital (A/D) conversion on data received by the antenna, for subsequently decoding the resultant digital data, for detecting speech quality, for calculating an error rate and performing an error correction and for analyzing a received frame; 12 a transmitting portion for generating a transmitting frame and performing a coding operation, for then performing a digital-to-analog (D/A) conversion and for transmitting resultant analog signals; 13 a digital signal processor (DSP) portion (hereunder referred to simply as a DSP portion) for decoding data inputted through the receiving portion 11 into a voice signal, for then performing a D/A conversion on the voice signal and outputting a resultant voice from a speaker 14, for performing an A/D conversion on voice signals inputted through a microphone 15 and for encoding resultant digital signals and outputting resultant code signals to the transmitting portion 12; 16 a CPU for controlling the receiving portion 11 and the transmitting portion 12, for performing a detection of speech quality, which should be carried out at the time of transmitting an SACCH frame (namely, a control channel which can be used during communications) as a requirement in the system, and calculating an error rate, for then transmitting to a base station a signal representing a result of the calculation, for measuring a received level of speech quality every reception of an SACCH frame of a TDMA frame structure transmitted from the base station by detecting data representing the speech quality in the SACCH frame and for controlling and operating a speaker 18, which serves as an alarming means, in such a manner to produce a warning tone in the case where the received levels of the number being equal to or larger than the predetermined number, are less than the predetermined level; and 17 a counter portion for counting the number of times, at which a received level is lower than the predetermined level, according to a result of the comparison between the predetermined level and each of the received levels, which is made by the CPU 16.

Figure 2:
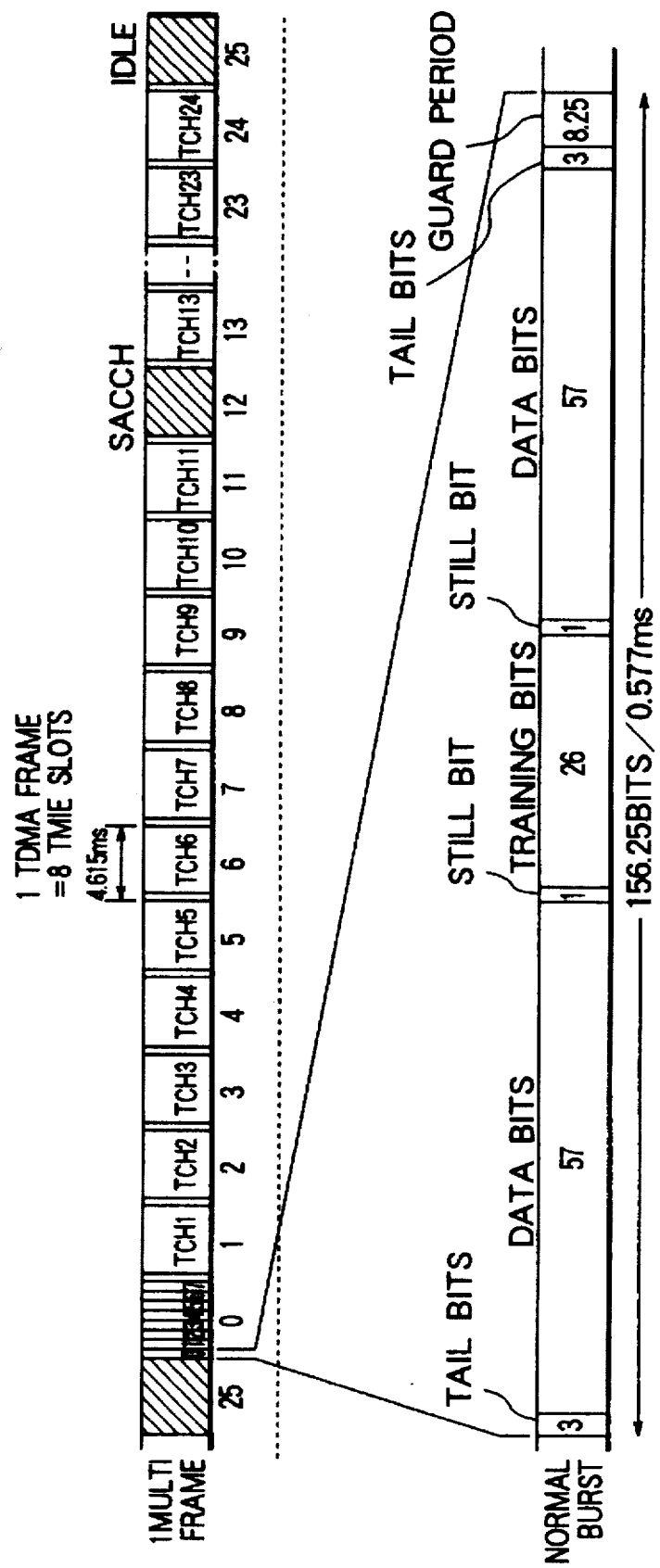
FIG. 2 is diagram for illustrating the structure of a TDMA frame.

Further, FIG. 2 illustrate the structure of a TDMA frame transmitted from the base station. Moreover, a multiframe consists of 26 TDMA frames, namely, traffic channel frames TCH0 to TCH11 and TCH13 to TCH24, an SACCH frame provided between the traffic channel frames TCH11 and TCH12, and an idle frame IDLE. Further, one TDMA frame, which contains a time required for interleaving, has a duration of 4.615 ms and is composed of 8 multiplexed time slots. Moreover, one time slot contains a total of 156.25 bits and consists of a burst, containing a total of 148 bits, namely, 3 tail bits, 57 data bits, a still bit, 26 training bits, a still bit, 57 data bits and 3 tail bits arranged in this order and a guard period containing 8.25 bits. Furthermore, one time slot has a time duration of about 0.557 ms. The 57-bits data contains voice data. Additionally, data representing speech quality is included in the SACCH frame.

Next, an operation of the mobile station having the aforementioned configuration will be described hereinbelow.

A current received level is measured and a result of the measurement is included in an SACCH frame to be transmitted by the base station of the TDMA mobile communication system. If this level is sufficiently high, there is no problem. In contrast, if this level is rather low, there is the possibility of an occurrence of interruption of a call, which is peculiar to the system of the TDMA type. To prevent an occurrence of the interruption of a call, the mobile station of FIG. 1 operates as follows.

Namely, the CPU 16 measures the received level of the speech quality by detecting the data representing the speech quality in the SACCH frame of a multiframe of FIG. 2 according to a result of analysis of the received frame, which is performed by the receiving portion 11. In the case where the received level is lower than a preset or predetermined value, the CPU 16 causes the counter portion 17 to start counting. Then, if the received level corresponding to the next SACCH frame is lower than the predetermined value, the count is incremented. When the count reaches the predetermined value, the CPU 16 causes the speaker 18, which serves as an alarming means, to produce a warning tone. Thus, a warning is given to users who currently use the system. If the received level corresponding to the next SACCH has a favorite value during counting, the count made by the counter portion 17 is reset. If the received level corresponding to the subsequent SACCH frame is low, the counter portion 17 starts counting again.

Figure 3:
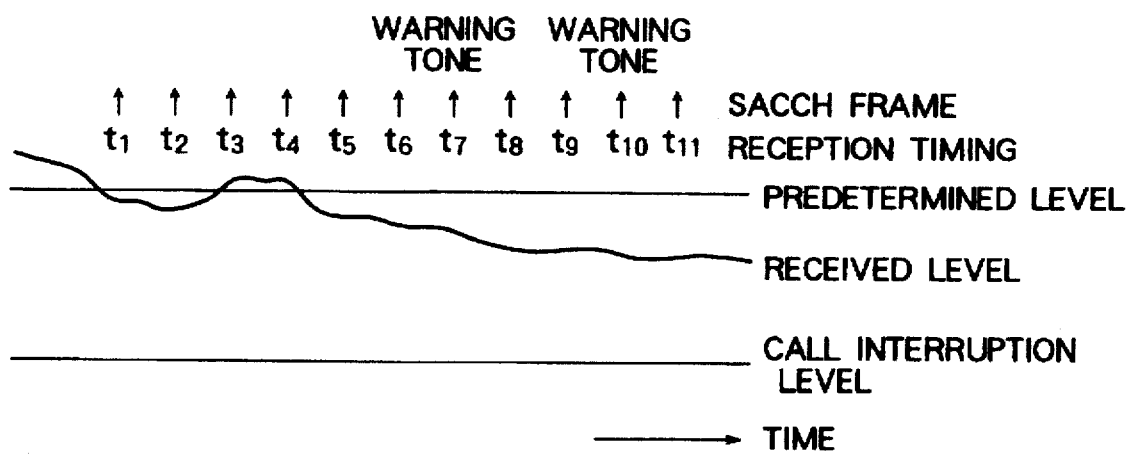
FIG. 3 is a timing chart for illustrating an operation of a central processing unit (CPU) of FIG. 1 in order to describe the mobile communication system, namely, Embodiment 1 of the present invention.

Turning to FIG. 3, there is shown a timing chart for illustrating an operation of the CPU 16. In the case where the received level measured by detecting the data representing speech quality in the SACCH frame gets closer to a call interruption level and further becomes lower than the predetermined level, namely, in the case where a moment, at which a SACCH frame is received, is $t_5$, the counter portion 17 is caused to start counting. If the received levels corresponding to the subsequent two moment $t_6$ and $t_7$, at which two SACCH frames are respectively received, are still lower than the predetermined level, the count is incremented. When the count reaches a predetermined number of times, namely, 3 in this case, the speaker 18 is operated to produce a warning tone. Incidentally, after the count reaches 3, the counting operation is resumed. Thereafter, when the count reaches the predetermined number of times again, namely, at a moment the $t_{10}$ when a SACCH frame is received, a warning tone is sounded once again.

Thus, in the case of Embodiment 1, a warning tone is generated in the case where the received levels, which are successively measured a predetermined number of times by detecting data representing speech quality in SACCH frames at the moments when the SACCH frames are respectively received, become lower than the predetermined level. Consequently, the system of this embodiment can inform a user of the possibility of an occurrence of interruption of a call.

Embodiment 2

In the case of this embodiment, a warning tone is produced in the case where received levels, which are successively measured a predetermined number of times by detecting data representing speech quality in TCH frames at given moments when the TCH frames TCH0 to TCH24 of FIG. 2 are respectively received, are lower than the predetermined level, differently from Embodiment 1 in which a warning tone is generated in the case where the received levels, which are successively measured a predetermined number of times by detecting data representing speech quality in SACCH frames at the moments of FIG. 2 when the SACCH frames are respectively received, become lower than the predetermined level.

Figure 1:
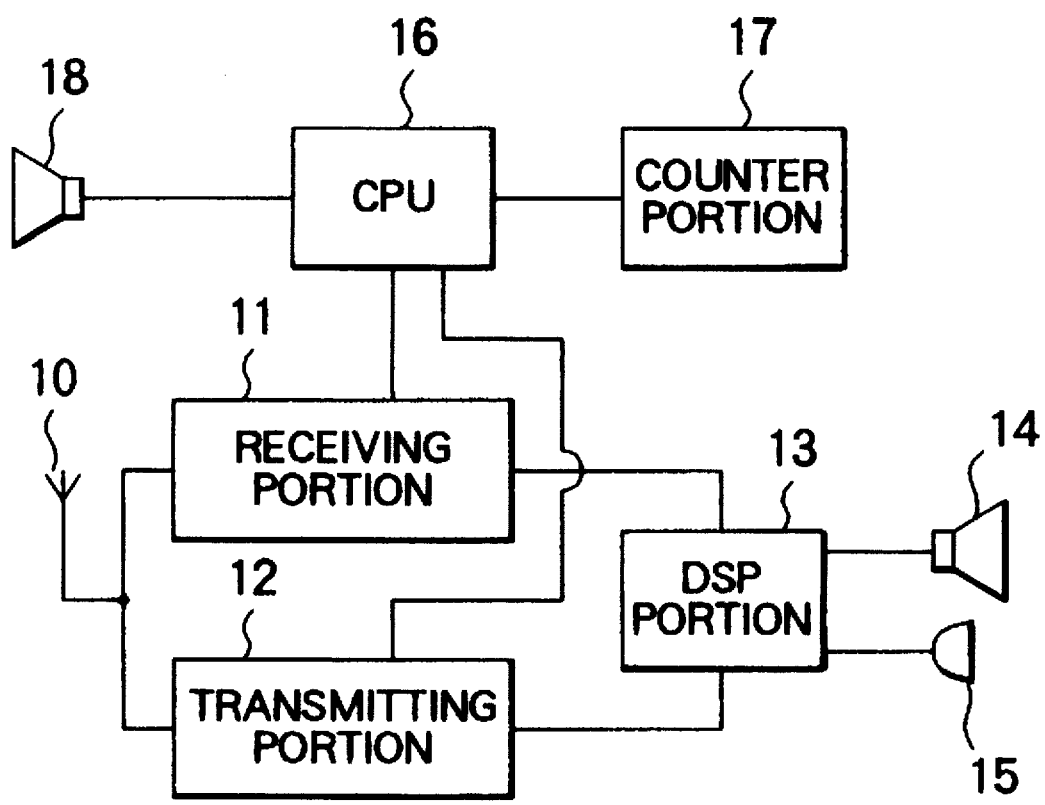
FIG. 1 is a block diagram for illustrating the configuration of a mobile station in order to describe mobile communication systems embodying the present invention, namely, Embodiments 1 and 2 of the present invention.

In the case of Embodiment 2, each mobile station employs a configuration similar to that of the mobile station of Embodiment 1 of FIG. 1. Incidentally, the timing of sampling received levels by use of the CPU 16 is different from that of Embodiment 1.

Figure 4:
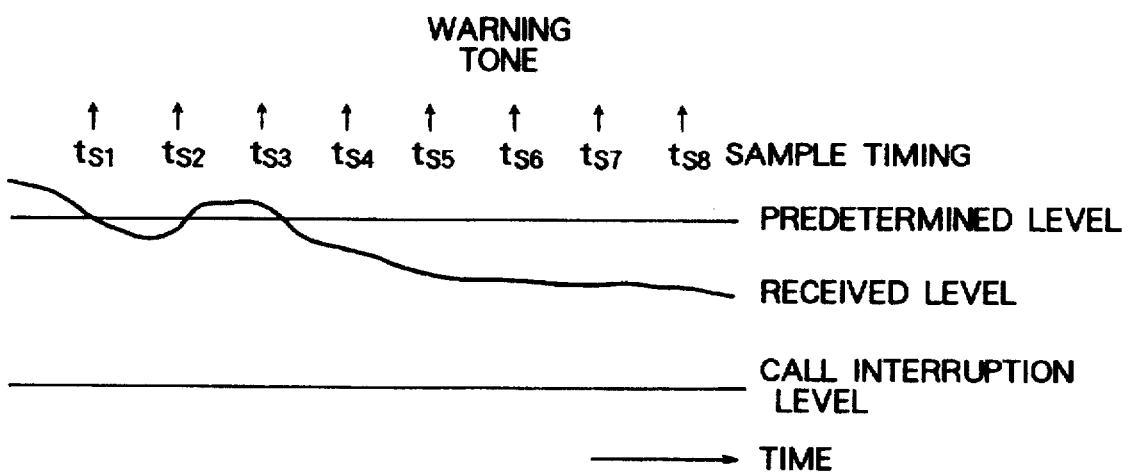
FIG. 4 is a timing chart for illustrating an operation of a CPU of FIG. 1 in order to describe the mobile communication system, namely, Embodiment 2 of the present invention.

Namely, referring now to FIG. 4, there is shown a timing chart for illustrating an operation of the CPU 16 of Embodiment 2. In the case where a received level measured by determining an arbitrary moment, at which one of traffic channel frames TCH0 to TCH24 is received, as the sampling moment and further detecting the data representing speech quality in the TCH frame gets closer to a call interruption level and further becomes lower than the predetermined level, namely, in the case where a moment, at which a TCH frame is received, is $t_{\rho 4}$, the counter portion 17 is caused to start counting. If the received levels corresponding to the subsequent two moment $t_{\rho 5}$ and $t_{\rho 6}$, at which corresponding two TCH frames are respectively received, are still lower than the predetermined level, the count is incremented. When the count reaches a predetermined number of times, namely, 3 in this case, the speaker 18 is operated to produce a warning tone. If the received level, which is measured correspondingly to the next TCH, has a favorite value during counting, the count made by the counter portion 17 is reset. If the received level corresponding to the subsequent TCH frame is lower than the predetermined level, the counter portion 17 starts counting again.

Thus, in the case of Embodiment 2, a warning tone is generated in the case where the received levels, which are successively measured a predetermined number of times by detecting data representing speech quality in TCH frames at given moments when the TCH frames are respectively received, become lower than the predetermined level. Consequently, the system of this embodiment can notify a user of the possibility of an occurrence of interruption of a call.

Embodiment 3

Figure 5:
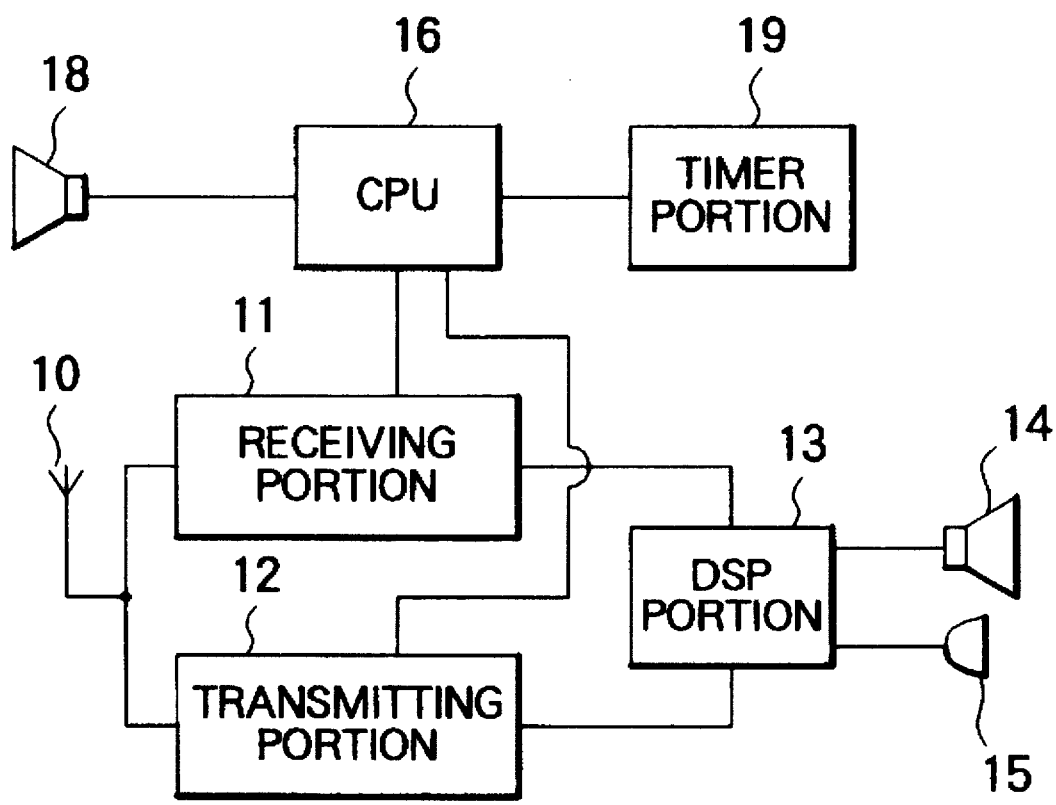
FIG. 5 is a block diagram for illustrating the configuration of a mobile station in order to describe mobile communication systems embodying the present invention, namely, Embodiments 3 and 4 of the present invention.

Referring next to FIG. 5 for illustrating a mobile communication system embodying the present invention, namely, Embodiment 3 of the present invention, there is shown the configuration of another mobile station.

In this figure, like reference characters designate like parts of Embodiment 1 of FIG. 1. Namely, reference numeral 10 denotes an antenna; 11 a receiving portion; 12 a transmitting portion; 13 a DSP portion; 14 a speaker; 15 a microphone; 16 a CPU; and 18 a speaker. Reference numeral 19, however, designates an additional composing element, namely, a timer portion serving as a timer under the control of the CPU 16 adapted to measure a received level of speech quality according to a result of an analysis of a received frame by means of the receiving portion 11 every reception of an SACCH frame of a TDMA frame structure transmitted from the base station by detecting data representing the speech quality in the SACCH frame and also adapted to control and operate a speaker 18, which serves as an alarming means, in such a manner to produce a warning tone by operating the timer portion 19 when the received level is less than the predetermined level, even after an overflow occurs in the timer portion 19.

Next, an operation of the mobile station having such a configuration will be described hereinbelow.

A current received level is measured and a result of the measurement is included in an SACCH frame to be transmitted by the base station of the TDMA mobile communication system. If this level is sufficiently high, there is no problem. Conversely, if this level is rather low, there is the possibility of an occurrence of interruption of a call, which is peculiar to the system of the TDMA type. To prevent an occurrence of the interruption of a call, the mobile station of FIG. 5 operates as follows.

Namely, the CPU 16 measures the received level of the speech quality by detecting the data representing the speech quality in the SACCH frame of a multiframe of FIG. 2 according to a result of analysis of the received frame, which is performed by the receiving portion 11. In the case where the received level is lower than a preset or predetermined value, the CPU 16 causes the timer portion 19 to start performing the functions of a timer. Even after an overflow occurs in the timer portion 19, if the received level is lower than the predetermined level, the CPU 16 causes the speaker 18, which serves as an alarming means, to produce a warning tone. Thus, a warning is given to users who currently use the system. If the received level reaches a favorite value until an overflow occurs in the timer portion 19, the operation of the timer portion 19 is reset. If the received level corresponding to the subsequent SACCH frame is lower than the predetermined level, the timer portion 19 starts performing the functions of a timer again.

Figure 6:
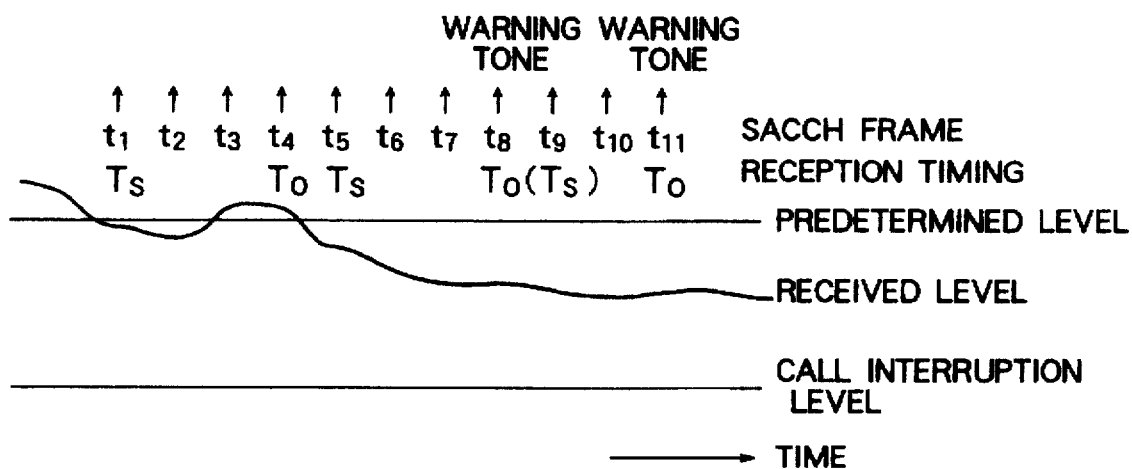
FIG. 6 is a timing chart for illustrating an operation of a CPU of FIG. 5 in order to describe the mobile communication system, namely, Embodiment 3 of the present invention.

Namely, turning to FIG. 6, there is shown a timing chart for illustrating an operation of the CPU 16. In the case where the received level measured by detecting the data representing speech quality in the SACCH frame gets closer to a call interruption level and further becomes lower than the predetermined level, namely, in the case where a moment $t_s$, at which a SACCH frame is received, is determined as a starting moment $T_r$, at which the timer portion 19 is caused to start performing the functions of a timer. If the received level corresponding to the subsequent moment $t_8$, at which a SACCH frame is received, namely, the overflow moment $T_0$, at which an overflow occurs in the timer portion 19, is still lower than the predetermined level, the speaker 18 is operated to produce a warning tone. Incidentally, the timer portion 19 commences performing the functions of a timer at the overflow moment $T_o$ by employing this moment as a starting moment $T_r$. Thereafter, when the received level measured at a moment $t_{11}$ when a SACCH frame is received, namely, at the next overflow moment when an overflow occurs in the timer portion 19, a warning tone is sounded once again. Additionally, the received level measured at the moment $t_1$ when an SACCH frame is received, is lower than the predetermined level. Therefore, the timer portion 19 performs the functions of a timer. However, the received level becomes higher than the predetermined level at the next overflow moment $T_0$. Therefore, at that time, the CPU 16 does not cause the speaker 18 to operate. Consequently, no warning tone is produced.

Thus, in the case of Embodiment 3, a warning tone is generated in the case where the received levels, which are successively measured during a predetermined period of time by detecting data representing speech quality in SACCH frames at the moments when the SACCH frames are respectively received, become lower than the predetermined level. Thereby, the system of this embodiment can inform a user of the possibility of an occurrence of interruption of a call.

Embodiment 4

In the case of this embodiment, a warning tone is produced in the case where received levels, which are successively measured during a predetermined period of time by detecting data representing speech quality in TCH frames at given moments when the TCH frames TCH0 to TCH24 of FIG. 2 are respectively received, are lower than the predetermined level, differently from Embodiment 3 in which a warning tone is generated in the case where the received levels, which are successively measured a predetermined period of time by detecting data representing speech quality in SACCH frames at the moments when the SACCH frames are respectively received, become lower than the predetermined level.

In the case of Embodiment 4, each mobile station employs a configuration similar to that of the mobile station of Embodiment 3 of FIG. 5. Incidentally, the timing of sampling received levels by use of the CPU 16 is different from that of Embodiment 1.

Namely, referring now to FIG. 7, there is shown a timing chart for illustrating an operation of the CPU 16 of Embodiment 4. In the case where a received level measured by determining an arbitrary moment, at which one of traffic channel frames TCH0 to TCH24 is received, as the sampling moment and further detecting the data representing speech quality in the TCH frame gets closer to a call interruption level and further becomes lower than the predetermined level, namely, in the case where a moment, at which a TCH frame is received, is determined as a starting moment $T_r$, at which the timer portion 19 is caused to start performing the functions of a timer, and the received level corresponding to the subsequent overflow moment $T_0$, at which a TCH frame is received, is still lower than the predetermined level, the speaker 18 is operated to produce a warning tone. Incidentally, the timer portion 19 commences performing the functions of a timer at the overflow moment $T_0$ by employing this moment as a starting moment $T_r$. Thereafter, when the received level measured at the next overflow moment $T_0$, when a TCH frame is received, is still lower than the predetermined level, the speaker 18 is caused by the CPU 16 to produce a warning tone. Additionally, the received level measured at the moment when a TCH frame is received, is lower than the predetermined level. Therefore, the timer portion 19 performs the functions of a timer. However, if the received level becomes higher than the predetermined level at the next overflow moment $T_0$, the CPU 16 does not cause the speaker 18 to operate. Consequently, no warning tone is produced.

Thus, in the case of Embodiment 4, a warning tone is generated in the case where the received levels, which are successively measured during a predetermined period of time by detecting data representing speech quality in TCH frames at given moments when the TCH frames are respectively received, become lower than the predetermined level. Consequently, the system of this embodiment can inform a user of the possibility of an occurrence of interruption of a call.

Incidentally, in each of the cases of the configurations of FIGS. 1 and 5, the speaker 14 is provided therein separately from the speaker 18. A single speaker, however, may be used in common instead of the speakers 14 and 18. Additionally, in each of the cases of Embodiments 1 to 4, the speaker is used as the alarming means. Other alarming means such as a lamp may be used in place of the speaker.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A mobile communication system for transmitting and receiving data by performing time division multiple-accessing, comprising at least one base station and at least one mobile station, said at least one mobile station including;

an alarming means for alarming according to an alarm control signal; and a control means for outputting said alarm control signal to said alarming means according to a comparison between a received level, which is obtained on the basis of a result of a detection of speech quality by said control means of an arbitrary frame within received frames as received by said control means, and a predetermined level;

wherein the mobile station has a counter portion for counting the number of times, at which the received level is less than the predetermined level, according to results of the comparisons between the received level and the predetermined level, which is made by the control means, wherein the control means is adapted to measure a received level by, each time when a frame is received, detecting data representing speech quality within the frame, and to further output an alarm control signal when it is known from data representing the number of times counted by the counter portion that received levels, which are successively obtained a predetermined number of times, are less than the predetermined level.

2. The mobile communication system according to claim 1, wherein the control means is adapted to detect data representing speech quality in a slow associated channel frame every time a slow associated channel frame is received.

3. The mobile communication system according to claim 1, wherein the control means is adapted to detect data representing speech quality in a traffic channel frame every time a traffic channel frame is received.

* * * * *